Nov. 24, 1959
R. DONDE GOROZPE
2,914,005
APPARATUS FOR PREPARING A QUICK-COOKING RICE PRODUCT FROM BROKEN RICE
Filed Sept. 27, 1956
2 Sheets-Sheet 2
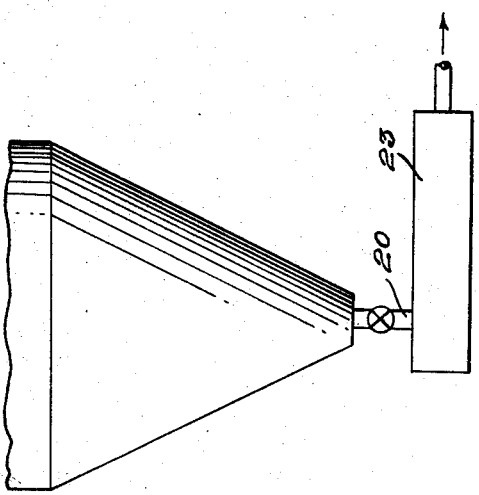
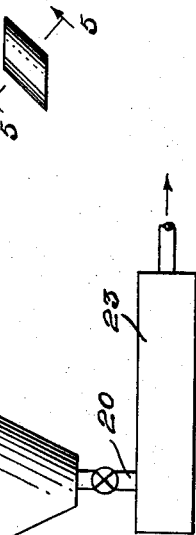
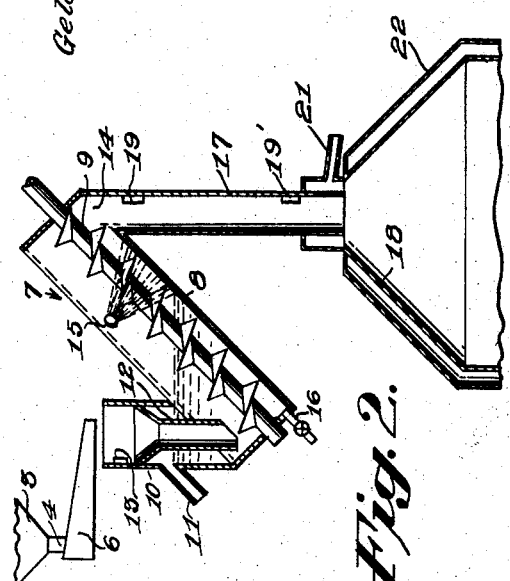
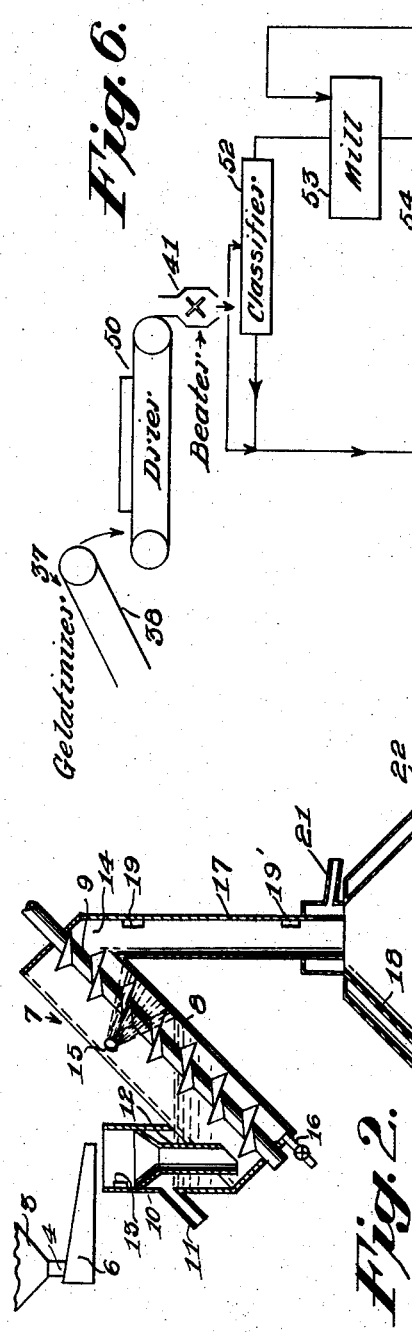
INVENTOR
Raul Donde Gorozpe
BY
ATTORNEY

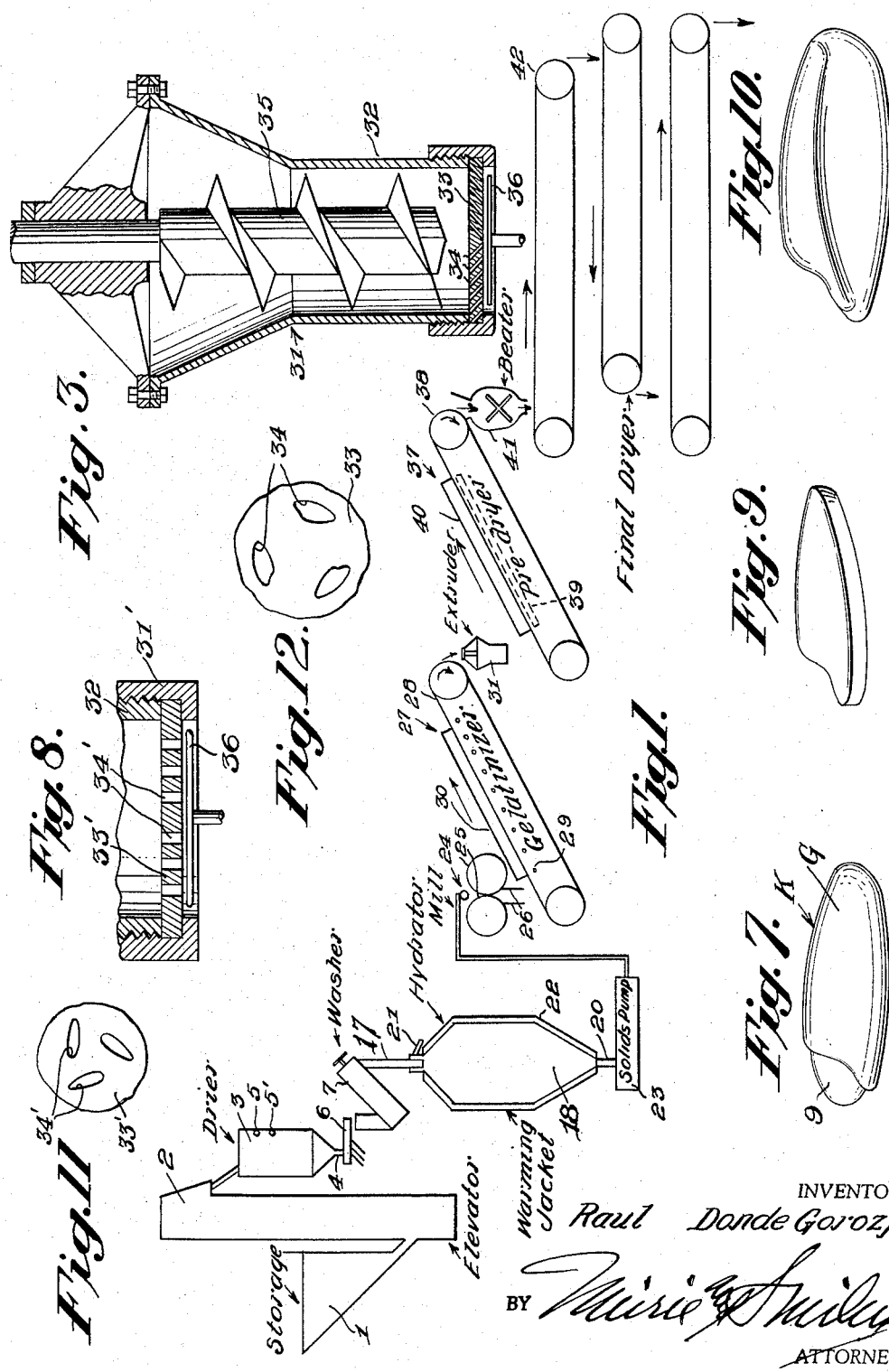

United States Patent Office 2,914,005
Patented Nov. 24, 1959

2,914,005

APPARATUS FOR PREPARING A QUICK-COOKING RICE PRODUCT FROM BROKEN RICE

Raul Donde Gorozpe, Cordoba-Veracruz, Mexico

Application September 27, 1956, Serial No. 612,469

2 Claims. (Cl. 107—14)

This invention relates to apparatus for preparing a quick-cooking rice product, and more particularly to the production of such a product from broken rice. The invention also relates to the rice product itself.

In the husking and milling of rice to produce white rice, a large proportion of the grains or kernels are broken. When the rice is subsequently graded, the broken grains are separated from the whole grains and the broken grades are used for livestock feed while the better whole grades are prepared for sale for table use. Furthermore, the lower quality whole grades, which include smaller, malformed and/or discolored grains are much less desirable, and have a much lower market price than the better grades of larger long pure white grains. As a result, these lower quality whole grades are also relegated to use in livestock feed or the like. Consequently, the better quality whole grades are relatively expensive, whereas, the broken grades and lower quality whole grades are quite inexpensive.

Having in mind the defects of the prior art rice products and methods of preparing them, it is the principal object of the present invention to provide a white rice product formed from lower quality grades of rice but which resembles, in appearance, quick-cooking whole rice.

Another object of the present invention is to provide a highly desirable white rice product formed from lower quality grades of rice.

Still another object of the present invention is to provide a process for producing a white, quick-cooking rice product from lower quality grades of rice.

Yet another object of the present invention is to provide a quick-cooking rice product at a price lower than that of the present precooked products by using a readily available, inexpensive raw material in a simple, economical and continuous manufacturing process.

A further object of the invention is to provide a rice product whose porous structure enables a quick and complete penetration of the product by boiling water as used by the housewife in the process of reconstituting the product.

A still further object of the invention is to provide a very nutritious food enriched with vitamins, minerals and protein and that when cooked and served at the table is identical in its appearance with ordinary or quick-cooking rice made from whole grains, but is more valuable as a food, with greater economy in price and time of cooking and fuel expense.

Briefly, the essence of the present invention resides in milling swelled, ungelatinized rice which is hydrated throughout to reduce it to very porous fluffy, non-flaky, granular material, gelatinizing the granular material throughout, and drying the gelatinized material to 10–14% moisture content, which is the normal in rice. The final product may be in the form of a meal for use in preparing cream of rice, or a flour, in which event the particles of the gelatinized material are separated or ground after being dried. Alternatively, the gelatinized material may be formed in grains before drying, preferably by extruding the gelatinized articles in small-rod-like strings and cutting the extruded strings to form individual grains. In either case, the resulting product is a white quick-cooking product and in the latter case, it is a grain resembling whole grain quick-cooking rice and is indistinguishable therefrom when prepared for table use. Refinements in the process to preserve substantially all of the original nutritive values of the rice and/or to expedite the process so that it may be continuous, comprise quickly drying the broken rice to cause it to crack or check to increase its absorptiveness, washing the checked rice with a minimum of water and agitation to avoid removal of the outer layers and their nutrients, hydrating the rice with the surface water carried by it from the washing step and without excess water, and gelatinizing the milled particles throughout by steam to preserve the nutrients.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Fig. 1 is a diagrammatic layout of the apparatus employed in the process for producing a whole grain product;

Fig. 2 is an enlarged diagrammatic cross-sectional view of the washer and hydrator;

Fig. 3 is an enlarged cross-sectional view of the extruder;

Fig. 4 is a side view in elevation of a rice grain produced by the extruder and cutter;

Fig. 5 is a cross-sectional view taken on line 5—5 of Fig. 4;

Fig. 6 is a flow diagram of a modification of the apparatus for producing a meal-like and/or flour product;

Fig. 7 is a view of a rice kernel;

Fig. 8 is a fragmentary cross-sectional view of a modification of the extruder;

Fig. 9 is a view in perspective of a grain of the product formed by the extruder shown in Fig. 8;

Fig. 10 is a view in perspective of the grain shown in Fig. 9 after treatment has been finished;

Fig. 11 is a fragmentary plan view of one type of die plate illustrating the shape of the orifices; and Fig. 12 is a fragmentary plan view of another die plate with another shape to the orifices.

The general process, according to the invention, comprises drying the broken and/or lower grades of white rice to relatively rapidly reduce its moisture content and cause it to check or develop cracks without breaking. Normally, the rice has a moisture content of 10–14%, and this is reduced through the quick drying by about 2–3% which causes checking of the rice. The drying step may be varied somewhat depending upon atmospheric conditions but normally, or under average conditions, the temperature of the rice may be raised above 100° F., preferably about 120° F., for a period of about 30 minutes.

The dried, checked rice is then washed to remove any foreign matter and to wet the broken grains. This washing is very gentle and quick to avoid removal of any of the surface layers and nutrients of the rice, and the rice is drained slightly so that it has only a film of water adhering to its surfaces. The wet or moist rice is then hydrated with the moisture carried by it from the washing process, excess water, if any, being removed to retain all of the nutrients of the original rice. This hydration is effected without gelatinization of any portions of the rice. The cracks in the checked rice enable ready permeation of the surface moisture and the rice is hydrated for a period ranging from 15 to 120 minutes at a temperature of 20° C. to 55° C. At this temperature, the rice swells and absorbs the water evenly to raise its moisture content to about 35–50%, depending largely upon the type of rice being processed.

The swelled, hydrated rice is then milled to form small particles preferably of about 1/64 of an inch in diameter or about 40 mesh screen size. The milling forms a very porous, fluffy granular ball-like material. At this stage, additives may be introduced if desired. This fluffy granular material is then steamed or otherwise heated to gelatinize the particles throughout. Steam gelatinization is preferred as it does not remove any nutrients or form a shell on the particles. Because of their size, perfect gelatinization throughout is obtained by steaming at atmopsheric pressure, and in no event, greater than 15 lbs. per square inch, for a period of from 1 to 5 minutes to raise the temperature to approximately 200° F.

The gelatinized particles are either dried to form a meal-like product or prior to drying, they are formed into grains resembling whole grain rice. In the latter case, the particles are extruded with the least pressure possible and without kneading so as to preserve the porous structures of the particles but cause them to adhere together. The product is extruded in small rod-like strings of a size about equal to the section of whole rice grains and these strings are cut in short lengths to form individual grains about equal in size to but preferably slightly larger than the better grades of whole rice gains.

To increase the resemblance to whole rice, the extruded strings may be oval in section and cut at an angle to their longer diameter to provide pointed ends similar to whole rice, or the strings may have a section that is generally oval but conforming to the shape of a grain of polished rice and cut perpendicularly of their length. As the extrusion causes a greater compression of the mass of material at the larger center portion, after the cutting the mass expands to a greater degree than the end portions so that the finished grain is oval in all longitudinal sections thereof, and has a great resemblance to a grain of polished rice.

The cut particles are predried rather rapidly to reduce the moisture content to about 20–25% and cause slight expansion to increase the porosity of the product. This predrying is effected for approximately 5 minutes at about 300° F. The predried rice is then agitated to separate any of the formed grains that may be adhered together and this agitation also serves to smooth or round the sharp cut edges of the grains so that they more closely resemble whole rice. The grains are then finally dried for about 10 minutes at a maximum of 150° F. to reduce the moisture content to the usual 10–14%.

The resultant product is classified and packed for commercialization. The rice product so produced has excellent keeping properties in storage because of the steam sterilization during gelatinization; it has a very high nutritive value because very little of the natural nutritive value is lost during processing; it is substantially pure white throughout; it is a very quick-cooking rice product; and when prepared for table use, it is practically indistinguishable from first grade large grain whole rice, except that the grains are desirably slightly larger, while its cost is only a fraction of that of whole rice.

In order to more clearly set forth one specific example, the process, according to the present invention, will now be described in detail with reference to the accompanying drawings, specifically Fig. 1.

Broken rice as obtained from the rice mills contains from 10–14% moisture. This material is dry-cleaned in the usual manner and the cleaned product conveniently stored in a bin or hopper 1 which supplies the rice to an elevator 2. The broken rice, with moisture content of 10–14%, is deposited by the elevator 2 in a drier 3 which comprises an upright bin provided with perforated tubes through which warm air is blown into and through the rice while it is in the bin. The bin may be provided with a hopper-like bottom with a discharge 4 at the lower end thereof and adjacent the upper end of the bin preferably are disposed a pair of vertically spaced limit switches 5 and 5' which are actuated by the rice and control the operation of the elevator 2 in known manner so that a relatively constant quantity of rice is kept in the bin.

The temperature of the air blown through the rice is at about 100° F., or slightly higher, preferably about 120° F., but can be varied depending upon atmospheric conditions and should not be so high as to scorch the rice. Usually, in continuous operation, the rice is in the drier for about 30 minutes, but this period can also be varied provided the moisture content of the rice is reduced, usually by about 2–3%, rapidly enough to cause the rice to check or crack. The cracks facilitate permeation of the grains by water in subsequent hydration steps. The dried rice is fed through the discharge of the drier 3 to a conveyor 6, preferably of the magnetic vibrator type, which regulates the feed at a constant output.

The conveyor 6 feeds the dried rice to a washer 7, best shown in Fig. 2, which preferably comprises a trough 8 that is inclined, preferably at about 45°, and has a screw conveyor 9 therein. At its lower end, the trough 8 is provided with an upstanding housing 10 forming a reservoir and having an overflow 11 disposed to maintain the water level about halfway up the trough. A funnel 12 is fixed within the housing 10 and has its outlet below water level and preferably immediately above the lower end of the screw 9. A limit switch 13 is within the upper end of the housing 10 or funnel 12 and is actuated by the rice to control the operation of the conveyor 6, in known manner. At its upper end, the trough 8 is provided with a discharge opening 14 in its bottom and a spray device 15 in its top above water level to spray the rice as it is lifted from the water by the screw 9. The spray device preferably is arranged so that very little, if any, spray is projected through the discharge opening 14. A valved drain 16 is provided at the bottom of the lower end of the trough.

The dried rice is fed by the conveyor 6 into the funnel 12 of the washer 7 which directs the rice under water and to the screw 9 so that the rice immediately absorbs some water and is subjected to the action of the screw 9 to prevent flotation and discharge of the rice through the overflow 11. When the funnel 12 is filled, the limit switch 13 is actuated by the rice to stop the conveyor 6. When the level of the rice in the funnel 12 is lowered so that it clears the switch 13, the switch is again actuated to start the conveyor 6. The screw 9 is driven at a slow speed, preferably about 10–20 r.p.m. to impart a gentle washing movement to the rice and enable foreign matter to be separated therefrom and either float out the overflow 11 or sink to the bottom to be removed through the drain 16.

The washing action produced by the screw imparts a minimum of agitation to the rice to prevent removal of the surface layers or any of the nutrients from the rice. As the rice is lifted from the water by the screw 9, it is washed by the spray 15 and the majority of the excess water drains down the trough 8 and out the overflow 11 so that principally, only wet rice, without an undesirable amount of excess moisture, is discharged through the opening 14. The very small quantity of water employed, as well as the gentleness of agitation, avoids reduction of the nutritive values of the rice.

From the discharge opening 14 of the washer 7, the wet rice is fed by a stack 17 to a hydrator 18, the stack 17 being provided with vertically spaced limit switches 19—19' which are actuated by the rice to control the operation of the washer screw 9 and the conveyor 6, in known manner. The hydrator 18 has a small collar-like portion surrounding and spaced from the lower end of the stack 17, this collar portion then extending into a tapered top widening from the lower end of the stack 17. The hydrator also has a conical or hopper-like bottom having a discharge 20 at its lower end, preferably controlled by a diaphragm valve or the like. An overflow drain 21 is provided at the upper end of the hydrator 18 in the collar-like portion just above the lower end of the stack for removing any excess water but retaining the rice, and the hydrator is provided with suitable heating means such as a warming jacket 22.

The wet rice, with the water carried by it, is stored in the hydrator for a period ranging from 15 to 120 minutes, depending upon the size of the hydrator. Preferably, the hydrator has a capacity equal to about 60 minutes run of the processing equipment. As the rice enters the hydrator 18 from the stack 17, it spreads out and fills the hydrator completely up the tapered top to the lower end of the stack, leaving only the small collar portion around the bottom of the stack free of rice. Thus, any material amount of air, which might cause fermentation, is eliminated from the hydrator.

The weight of the wet rice itself, both in the hydrator and in the stack, causes the rice to pack in the hydrator leaving only a film of water between the rice particles. This film of water is maintained during hydration by additional water draining down the stack 17. Any excess water is displaced by the rice completely filling the hydrator and such water is discharged through the overflow 21, but this seldom occurs when the rice is processed continuously. Obviously, if insufficient moisture is carried from the washer by the rice, water may be added in the hydrator.

By using only the surface water adhering to the rice for hydration, the rice takes on the necessary water to raise its moisture content to about 35-50% and, because of the lack of excess water, or any appreciable amount thereof, the original nutritive values of the rice are retained. The rice is heated in the hydrator by the warming jacket 22 to a temperature of 20-55° C. which is the swelling temperature of rice and expedites the absorption of the water without gelatinizing any portions of the rice.

The discharge 20 of the hydrator 18 is in communication with a solids pump 23 which controls the feed of the swelled, hydrated rice from the hydrator 18. In lieu of the pump 23, a screw or other type conveyor may be employed. It is to be noted that in the continuous processing of the rice, both the pump 23, or other type conveyor, and the conveyor 6 are regulated to have a constant output with the output of the conveyor 6 being greater than that of the pump 23 to maintain the hydrator 18 full at all times so that the rice is fully hydrated.

The pump 23 feeds the swelled rice to a mill 24, preferably a roller mill with rollers 25 driven at different peripheral speeds because they have a slight smearing action. In the mill, the rice is reduced to small particles, preferably of about 1/64 of an inch in diameter, or about 40 screen size, and, because the rice is swelled and hydrated there are no fines. As the particles are moist, they more or less tend to cluster loosely together in the form of small balls. The rollers 25 may be provided with scrapers 26 to remove any particles tending to adhere to their surfaces. The ball-like clusters of the particles are a very porous, fluffy, granular material and at this stage, any desired additives may be incorporated to enrich the product.

The milled particles are delivered to a cooker or gelatinizer 27, preferably comprising an endless conveyor 28 of a close mesh wire screen, the upper run of which overlies a heater 29, preferably formed by a series of steam nozzles, and is surmounted by an exhaust hood 30. The granular, fluffy product is spread evenly, without pressing, over the close mesh wire belt conveyor 28 where it is steamed at atmospheric pressure or pressure not greater than 15 lbs. per square inch. The steam is projected by the nozzles 29 up through the belt and the product. The layer of product on the belt has a depth of from ½ to 2", a depth of about 1½" being best for fast, continuous operation with good gelatinization. The time of steaming is from 1 to 5 minutes according to the degree of gelatinization desired, and the temperature of the product is raised to about 200° F. The steam passing upwardly through the layer of product causes a flotation and agitation of the particles to assure a more perfect gelatinization of all the particles throughout.

Gelatinization by steam is preferred over the use of boiling water or other types of heat. Steam does not remove any of the nutrients from the rice particles or granules as does boiling water, nor does it require the addition of moisture to prevent the formation of a shell on the surfaces of the particles nor risk scorching and discoloring the particles as does dry heat. Steam has the advantage of retaining the nutrients, improving the color by whitening the resulting product, sterilizing the material and more rapidly gelatinizing the particles throughout.

At this stage, the gelatinized particles may be subjected to alternative treatments depending upon the end product desired. The gelatinized particles may be molded or otherwise formed into grains about the size of whole grain rice and then dried to provide a product having the appearance of first quality white rice. As large white rice is preferred, the formed grains are preferably slightly larger by about 15-20% than the first quality whole grain rice. Conversely, the gelatinized particles may be dried and then any adhering particles separated or milled to produce a flour and/or meal-like product, for use in making cream of rice, as will be more fully described hereinafter. The grains are preferably formed by extruding the gelatinized particles and the conveyor 28 preferably extends beyond the hood 30 to permit cooling of the product to about 100° F. before it is discharged to an extruder 31 so as not to overheat and expand the extruder.

The extruder 31, as shown in Fig. 3, is somewhat similar to those used in spaghetti production, and comprises an open-topped container 32 having a bottom die 33, with extruding orifices 34, and a screw 35 within the container 32 for feeding the gelatinized particles to the die 33 and forcing them through the orifices 34. A rotary knife assembly 36 is disposed adjacent the outer face of the die 33 for cutting the extruded material into short lengths. The screw 35 is revolved slowly and is as short as possible to avoid kneading while providing sufficient pressure to force the gelatinized particles through the orifices 34. The pressure is just sufficient to cause the particles to adhere together without mashing them into a paste.

Preferably, the orifices are oval in cross-section and of a size about equal to the section of whole rice grains. Moreover, these orifices 34 are disposed at an angle to the plane of the knives of the assembly 36 and the knives are revolved in relation to the speed of extrusion at a rate to cut the extruded material into lengths about equal to or very slightly greater than whole, long grain rice. As large whole grain rice is the most desirable, the grains formed by the present process are preferably about 15-20% larger than first quality large whole grain rice. Preferably, the oval orifices 34 are arranged with their longer diameters at an angle to the plane of the knives 36. The adhered particles are extruded in rod-like strings of oval section and are cut at an angle to their section, preferably at an angle to their longer diameter, so that the resulting product is in the form of diamond shaped grains having pointed ends and resembling whole rice grains, as shown in Fig. 4, the resemblance to whole rice being increased by their oval section, as shown in Fig. 5.

A preferred form of extruder may be more conventional except for the shape of its orifices so as to form grains more closely resembling whole grains of polished rice. Referring to Fig. 7, a rice kernel K is substantially oval in conformation but it includes a grain G and a germ g, the grain G having a recess or depression at one end in which is nested the germ g. When the kernels K are milled and polished, the germ g is removed from the grain G and commercial, whole grain polished rice consists only of the grains G.

The preferred modified form of extruder 31', as shown in Fig. 8, comprises a container 32 with a die plate 33' having orifices 34' that extend axially through the die 33' and perpendicular to the knife assembly 36. The orifices 34', however, have a transverse section corresponding to the outline or configuration of a polished rice grain G so that the grains produced by this extruder are relatively thin flat slices which are generally oval with a recess in one side and adjacent the end, as shown in Fig. 9. It has been found that the oval configuration of the orifices, either 34 or 34', cause a greater mass of material to be compressed in the larger center portion than in the narrower end portions, and after the grains are formed, the greater mass swells back to its normal volume. As a result, the extruded, cut grains assume a generally oval configuration or longitudinal section so that the finished grains closely resemble polished rice grains G, as shown in Fig. 10.

The extruded grains are fed to a predrier 37, preferably comprising an endless wire screen conveyor 38, the upper run of which passes over a heater 39, such as a hot air outlet, and may be surmounted by a hood 40. Infrared lamps or equivalent devices may be mounted in the hood 40 either to supplement or replace the heater 39. The extruded grains are dropped freely from the extruder 31 onto the conveyor 38 which tends to separate any grains that might be adhered together. The grains are dried in the predrier 37 for a period of about 5 minutes at a temperature of about 300° F. This lowers the moisture content of the grains to about 20–25% and increases their porosity with a slight expansion but without puffing or scorching.

As the grains are discharged from the predrier 37, preferably they are fed to a beater 41 of the rotary type which causes separation of any grains which are adhered together and this agitation also serves to smooth or round the cut edges of the grains so that their resemblance to whole grain rice is increased. From the beater 41, the grains are fed to a final drier 42 where their moisture content is reduced to the normal 10–14%. The grains are treated in the final drier 42 for about 10 minutes at a temperature not greater than 150° F. to prevent formation of a crust by surface gelatinization. The rice product, with the normal 10–14% moisture content, is then classified and packed in the usual manner.

In using the product formed in accordance with the invention, the housewife adds 1–2 cups of boiling water to each cup of the rice product depending upon whether a hard or soft rice is desired. The water is brought to a brisk boil and as the rice, seasoning and the like, is being poured into the water, the heat is maintained and the mixture stirred for from ½ to 1 minute. Then the vessel is covered, removed from the heat and let stand for 10–15 minutes according to whether a hard or soft rice is desired. The rice as served has an identical appearance to first quality regular or quick-cooking whole grain rice now on the market.

In the modified process for producing a meal and/or flour, the gelatinized particles, instead of passing to the extruder, are fed directly to a drier 50, as illustrated in Fig. 6, in which the particles are dried throughout. Because of the small size of the particles, they dry rather quickly and are subjected to a temperature of about 150° F. for a period of about 3–5 minutes. As the dried particles are discharged from the drier, they may pass to the beater 41 so that adhering particles will be separated. The material discharged by the beater 41 may be collected in a bin 51 and employed for making cream of rice or the like, or if a higher quality product of greater uniformity is desired, the material from the beater may pass to a classifier 52 to separate the individual particles from any clusters, the particles passing to the meal bin 51 and the clusters to a mill 53. The product from the mill 53 may be separated by a classifier 54 into meal size which is collected in the bin 51, undersize and fines which are delivered to a mill 55 and oversize which are returned to the mill 53. The undersize and fine material is ground in the mill 55 and may be discharged to a classifier 56 which directs the flour to a bin 57 and returns the oversize to the mill 55 for regrinding.

Products according to the invention have greater value as a food and are more economical in price with the added advantages of economy in time and fuel in their preparation for table use. Only physical processes are used in treating the rice and foreign substances, with the exception of desired additives for enrichment, are not employed. The milling of the hydrated, swelled, ungelatinized rice eliminates loss through fines and enables more rapid and complete gelatinization. Also milling at this stage, avoids the subsequent formation of a paste that would result in a hard skinned product which would inhibit quick rehydration for table use. The gelatinization of small particles of rice instead of the whole grain provides a highly porous product that is quick-cooking to a degree not found in ordinary whole grain rice and produces a more digestible product which is uniformly white.

Although certain specific embodiments of the invention have been shown and described, it is obvious that many modifications thereof are possible. The invention, therefore, is not to be restricted except insofar as is necessitated by the prior art and by the spirit of the appended claims.

That which is claimed is:

1. Apparatus for preparing a quick-cooking rice product, comprising extruding means including a die having orifices of generally elongated section tapering at one end and rounded at the other end and substantially conforming to the size of polished whole rice grains, and cutting knives movable in a path perpendicular to the axes of said orifices, said orifices axes being parallel.

2. Apparatus for preparing a rice product, comprising extruding means including a die having orifices of elongated section tapering at one end and rounded at the other end and of approximately the size of polished whole rice grains, and cutting knives movable in a path closely adjacent and parallel to said die on the discharge side thereof.

References Cited in the file of this patent
UNITED STATES PATENTS

| | | |
|---|---|---|
| 312,265 | Gent | Feb. 17, 1885 |
| 1,116,945 | Spenst et al. | Nov. 10, 1914 |
| 1,226,642 | Demovitsch | May 22, 1917 |
| 1,553,573 | Tanzi | Sept. 15, 1925 |
| 1,573,694 | Espeseth | Feb. 16, 1926 |
| 1,810,125 | Brooks et al. | June 16, 1931 |
| 2,437,460 | Francisci | Mar. 9, 1948 |
| 2,498,573 | Ozai-Durani | Feb. 21, 1950 |
| 2,678,873 | Sable | May 18, 1954 |